United States Patent [19]
Primlani

[11] Patent Number: 5,548,522
[45] Date of Patent: Aug. 20, 1996

[54] MODULAR WIRING AND LIQUID GROUND

[76] Inventor: Indru J. Primlani, 2616 NE. 19th St., Renton, Wash. 98056

[21] Appl. No.: 327,961

[22] Filed: Oct. 24, 1994

[51] Int. Cl.$^6$ .................. G01R 19/00; H02B 1/20; C25B 5/00

[52] U.S. Cl. .................. 364/483; 174/5 R; 174/6; 204/196; 361/826

[58] Field of Search .................. 307/38, 40, 147; 364/550, 483, 492, 509, 510

[56] References Cited

U.S. PATENT DOCUMENTS

| | | | |
|---|---|---|---|
| 3,658,682 | 4/1972 | Fulkerson et al. | 204/224 |
| 3,930,111 | 12/1975 | Sheelor | 174/6 |

*Primary Examiner*—Emanuel T. Voeltz
*Assistant Examiner*—Demetra R. Smith

*Attorney, Agent, or Firm*—David L. Tingey

[57] ABSTRACT

A modular wiring system using a plurality of field interface devices modularly selectively interconnected by wire bundles with redundant capacity to form a network of field interface devices each connected to a reference circuit, maintained at near-zero ground through a fluid electrolyte flowing through a grounded electrically-conducting pipe to which each field interface device is connected, is continually controlled by a central microprocessor that monitors electrical load and modifies connections of wires between bundles through switches within each field interface device to optimize load distribution within the system. Electrolyte flowing in conductive pipes is charged as it neutralizes potential differences between the field interface devices. The electrolyte is deposited in a grounded reservoir in which the electrolyte discharges its charge to anodes and cathodes therein in the manner of a battery, thereby extracting energy of the electrolyte before the electrolyte is pumped back into the ground pipes.

20 Claims, 3 Drawing Sheets

5,548,522

MODULAR WIRING AND LIQUID GROUND

FIELD OF THE INVENTION

This invention relates generally to building wiring for electrical loads and controls. More particularly, it relates to a building provided with bundled wires between a plurality of processor-controlled node points to which electrical loads are connected, therein establishing a redundancy of electrical circuits. A computer monitors electrical loads within the circuits and continually alters circuit connections between node points to maintain an optimum distribution of electrical loads. The circuits are connected to a near-zero potential ground by means of a liquid ground system.

BACKGROUND OF THE INVENTION

Electrical controls and overcurrent devices presently protect power in buildings feeder circuit irregularities. The controls may include a draw out power circuit breaker switchgear assembly, metal-enclosed distribution switchboards, panelboards mounted in or on the transformer sections and other secondary protective devices. Electrical systems in commercial buildings usually include panelboards utilizing fusible or circuit breaker devices, or both. Local circuit distribution panels have most of the overcurrent devices rated at 30 A (amperes) or less, for which neutral connections are provided. These panels fit in between studs or other structural members and are scattered throughout the building as load centers.

Energy management systems (EMS) for reducing building energy consumption use computer-based controllers. These EMS controllers can be used to control virtually all energy using equipment in buildings and industrial plants. Equipment controlled include fans, pumps, boilers, chillers, lights and specialized equipment.

The individual instruments and computer components usually have all exposed metal parts connected to the power supply ground. During faults on utility supply lines, potential differences of several hundred volts may be generated between local electrical equipment and a substation ground up to several thousand feet away. On a less spectacular scale, leakage currents may produce potential differences of many millivolts between instruments within a same room, causing errors in the proper operation of the devices.

Traditionally, wiring of building facilities is designed with over capacity to assure adequate capability in worst-case electrical load scenarios, employing large wires. Because of impedance differences throughout, ground wires are commonly returned from a load to a reference node, but voltage differences remain causing power losses.

It is the object of present invention to provide for a simplified wiring installation. It is another object that the installation reduce conductor volume required in over-specification using excessively large wires without compromising wiring utility by continually redistributing electrical load among a variable network of wires. It is a further object that installation be achieved using lesser-skilled labor and in less time, thereby reducing the cost of installation.

It is a yet another object that the resulting wiring installation be maintained at near-zero ground thereby conserving electrical power by eliminating EMF differences between ground points.

SUMMARY OF THE INVENTION

These objectives are achieved in a modular wiring system using wire bundles with redundant capacity connected to a reference circuit maintained at near-zero ground through a fluid electrolyte flowing through a grounded electrically-conducting pipe.

Presently neutral and ground wires are connected to central power panels with neutral and ground buses. This creates ground impedance and power losses. This invention provides local access to neutral and ground connections at the building ground pipe loop instead of returning wires to the panel. Zero pipe loop potential permits direct "earth" connections.

A bundle of homerun wires emanate from a computer-controlled relay bank to each of a plurality of processor-controlled field interface devices (FIDs), each having unique computer-identified address. A further bundle of wires may be electrically connected to each FID as application may dictate. Each bundle of wires includes a large number of wires but in sum comprises less volume and conductor material than a standard wire traditionally called-for in an equivalent application for which the bundle substitutes. One or more electrical load are connected to each FID, each load also uniquely identified to the controlling computer with an identifiable address.

The controlling computer typically communicates with each FID by multiplexing a data signal on the power transmission and directs each FID to selected wires in the various bundles to establish an optimized installation circuit, which is continually monitored and redetermined as conditions change.

Grounding is provided in an electrically-conducting pipe through which an electrolyte fluid passes. The fluid is fed from a reservoir sunk in the earth to establish a true electrical ground. Where the pipe is the electric ground for the circuits, the electrolyte becomes an additional fluid load that is charged by any EMF in the various circuits and carries that charge to the reservoir where it is discharged before returning into circulation within the pipes. Because circuit power is conducted on the surface of the pipe, the ground circuit interacts only minimally with the electrolyte fluid.

The electrolyte reservoir becomes a chemical battery extracting electrical energy from the electrolyte when a battery anode and cathode are placed in the reservoir and electrically connected in a circuit.

Capacitors countering current lags are provided to conserve energy and improve electrical power quality.

BRIEF DESCRIPTIONS OF THE DRAWINGS

FIG. 1 schematically shows a computer-controlled modular wiring system with distributive load with near-zero ground established by a fluid electrolyte within a conducting pipe connected to a electrolyte reservoir.

FIG. 2 shows the electrolyte reservoir.

FIG. 3 schematically shows a plurality of field interface devices interconnected in a network by bundles of wires.

DETAILED DESCRIPTION OF THE PREFERRED EMBODIMENTS

Figure 1:
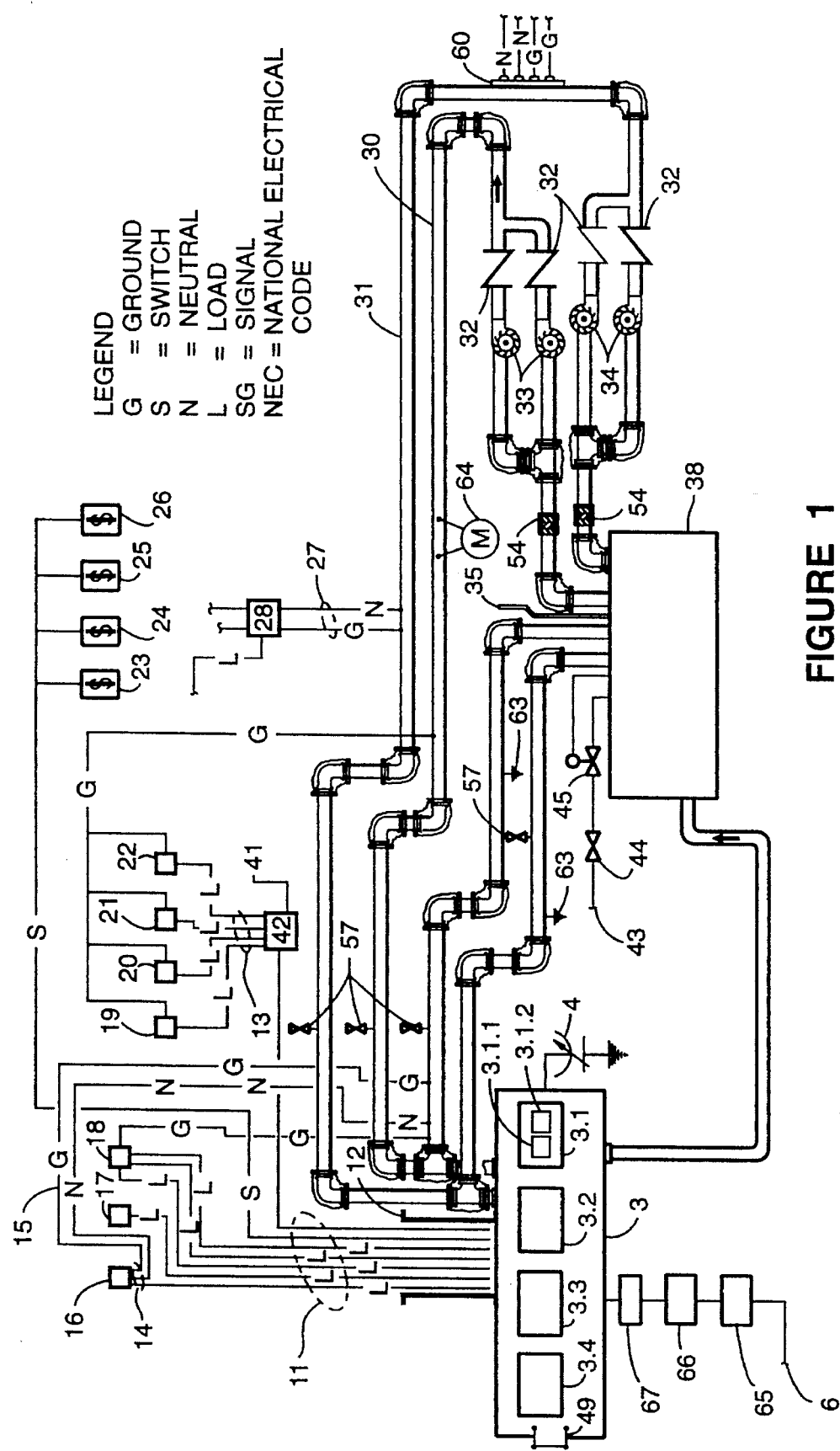
Figure 2:
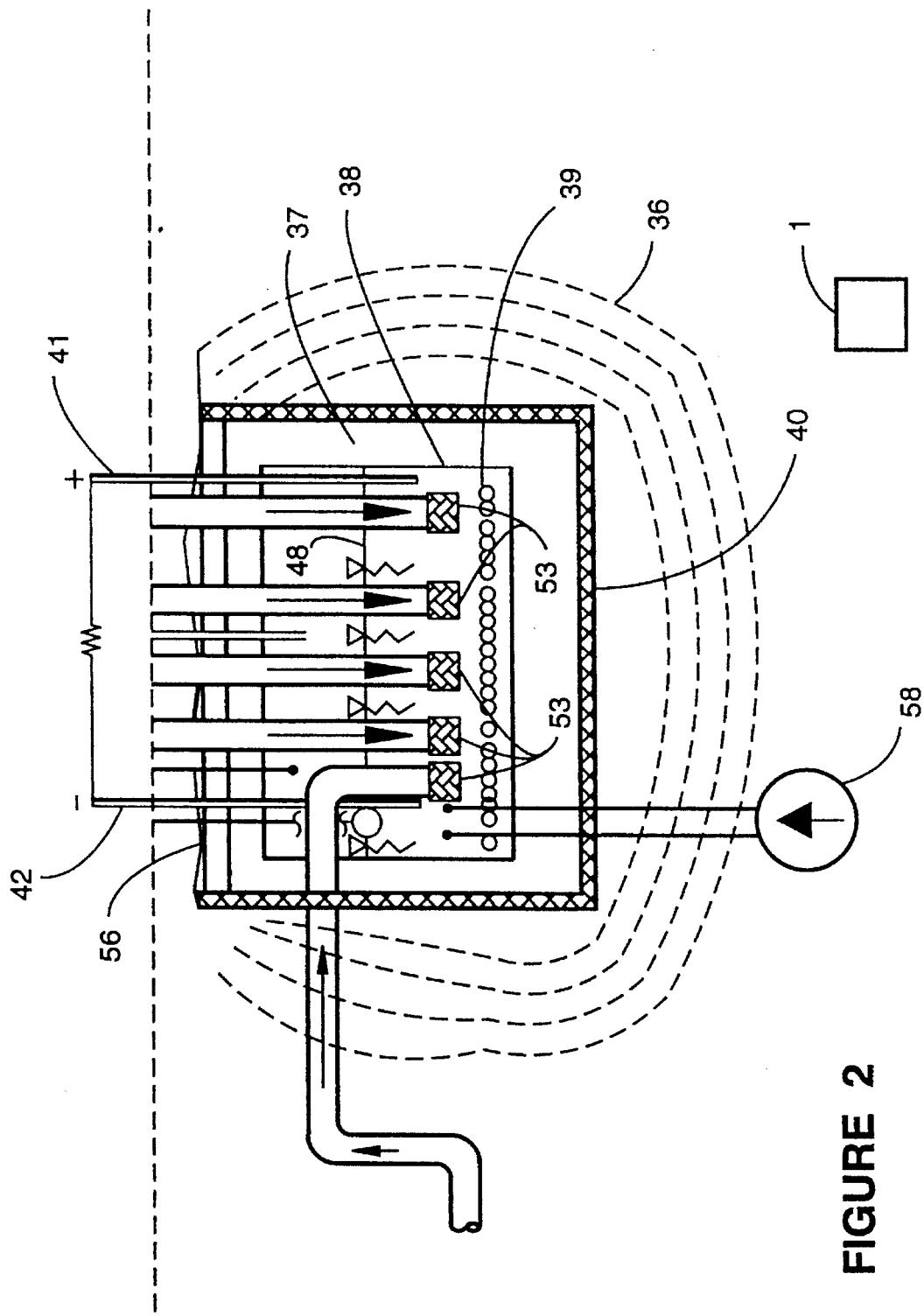
Figure 3:
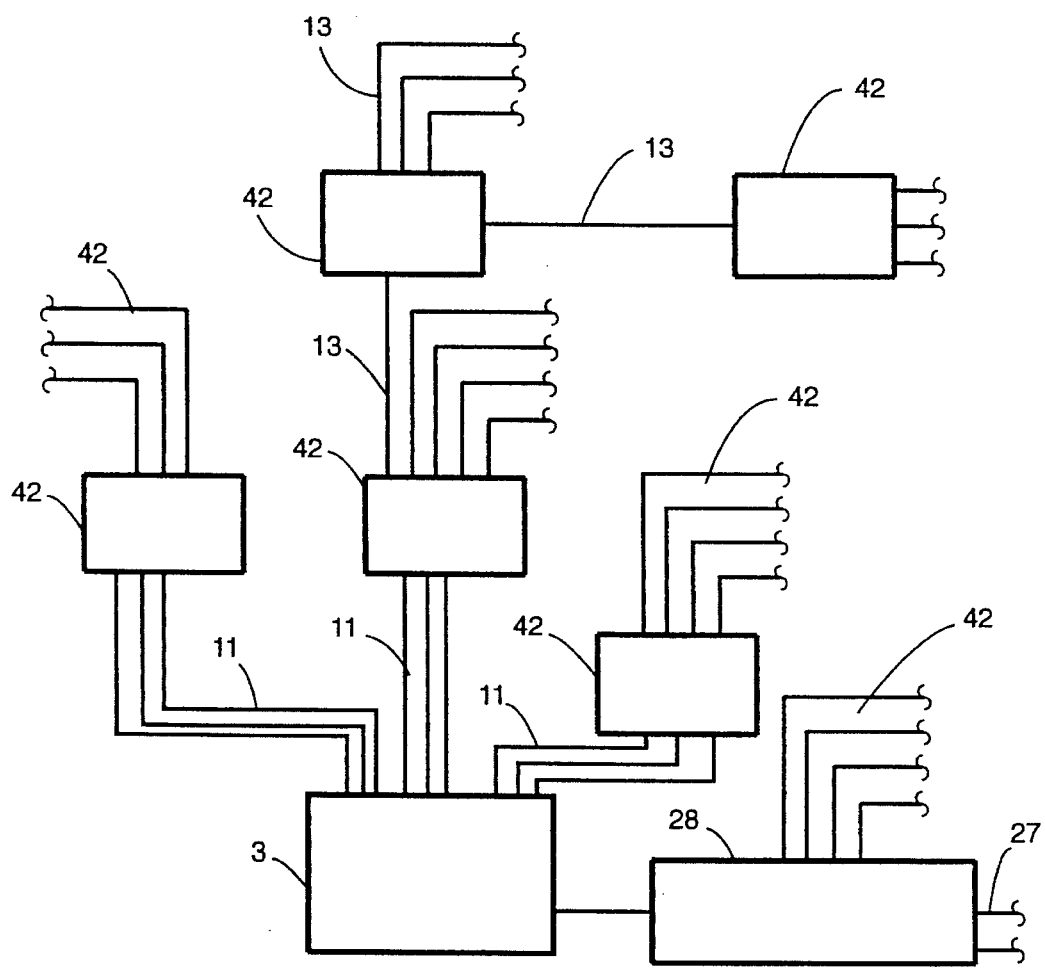

Referring to the figure, incoming power service feed line 6 is connected to wiring system computer control module 3 through isolation transformer 65, which is meant to include power quality conditioning equipment such as a filter/suppresser device 66 and voltage regulators 67, fused safety switches, circuit breakers or other similar protection devices to protect from utility power interferences from incoming service line 6. The computer control module 3 includes power module 3.2; receiving power from the isolation transformer 65; electronic switch and load transfer module 3.3 connected to the power module 3.2; relay and load adjustment module 3.4 comprising a bank of relays connected to and electronically switched by the load transfer module 3.3; and computer section 3.1 connected to the load adjustment module 3.3 and load transfer module 3.4. Wiring bundles 11 and 13 are coupled to the load transfer module 3.4.

Computer section 3.1 includes programmable microprocessors for directing electrical connections within the load transfer module 3.4 to designated address points in the wiring module and for directing internal electronic switching for load transfer in the relay control module 3.3. The computer section 3.3 also includes Energy Management software and Security system (EMS) software module 3.1.1 and Access systems software module 3.1.2.

As noted, all wiring devices within a building facility are labeled with unique address points through a FID. Shown in the figure are homerun circuits 16, 17, and 18 (complete electrical circuits between a load and the transfer module); branch circuits 41 with collecting circuit home run 42 serving branch loads 19, 20, 21 and 22; local manual override and automatic switching circuits 23, 24, 25 and 26; terminal boxes 28 with ground, neutral and power wires 27 from module 3.

Wires emanating from the load transfer module 3.4 are connected to individual loads as a home run or as a branch run. All such electric connections comprise a bundle of wires 11, 13, perhaps several hundred small wires in conduit 12. Home run termination is made at the load transfer module 3.4; branch circuits are connected via a home run to terminal blocks 28, 42 with connections to the individual branch circuits, 19, 20, 21, and 22. At each terminal block 28, 42 and load is a FID processor with a data communication link to the computer section 3.1. Said data communication is preferably through signals multiplexed over the power circuits, but any of several standard data transmission links such as the following is equivalent: (i) Shield twisted pair; (ii) Unshielded twisted pair; (iii) Coaxial cables; (iv) Radio frequency; (v) Microwave; (vi) Telephone systems; (vii) Fiber optics; (viii) Power line Carriers; (ix) Infra red signals; or (x) Laser signals.

With bundled wires 11, 13 connected to all FIDs there is a redundancy of circuits allowing the computer to analyze the electrical requirements presented by the several loads and to assign a preferred circuit for each load. Each FID has a unique address identified by the computer, and each load connected to a FID similarly has a unique address. As a new load is added into the wiring, it is randomly connected into an FID and a electrical path optimized within the wire bundles within the circuit redundancy. The computer is programmed to automatically shift loads with electronic switching and regulation with solid state relays between circuits so that each home run is loaded within code requirements, such as 16 amps for a 20 amp circuit, with automatic power protection switching and control switching. Load shifting is automatic and continuous.

In the event of a fault, one individual relay is locked on to the fault circuit and trip. That fault circuit will remain inactive until the condition is corrected, automatically or manually. An alarm system alerts the fault condition to the computer.

An emergency bypass for power 49 is provided in the event of failure of module 3. All controls and switching is then accomplished with local override controls.

The control modules are connected to a bank of variable capacitors 4 which automatically regulate the circuit power factor at all times by continuously scanning all inductive loads and automatically adjusting capacitance to provide almost unity power factor, thereby avoiding inductive losses and saving electrical energy. Typical power factor set point is 0.95 to 0.98.

Local or remote switching conductors is on one or more shielded or unshielded twisted pair telephone type wires or a multiplex loop that can be programmed so that any switch 23, 24, 25, and 26 would activate any addressed load or loads. With this programming capability, load circuits can come on and off as required by external use factors triggered such as by manual override switches, photosensors, occupancy sensors, temperature sensors, etc. with the computer continually optimizing circuit connections between FIDs.

The EMS includes software programmed in the computer to scheduling for automatic actuation of loads to reduce energy consumption; duty cycling for automatic timed on/off switching of loads to reduce energy consumption; electrical demand regulation for power peak savings to reduce electrical costs for demand limiting by selective load shedding and automatic adjustment of demand set point for time of day and time of year based on utility billing schedule; optimizing start/stop for equipment to reduce energy consumption; all sensor and parameter monitoring for reducing energy consumption and facilitating periodic maintenance; and computer based networking for communicating with all local devices, other modules 3 and other local devices. Network systems is intrasystem, campus wide systems, other complexes and general areas beyond.

A liquid ground loop system of metal conductive pipes 31 with traveling electrolyte 39 (such as a Silver Nitrate solution) serves as a zero potential ground 63. The electrolyte is pumped through the pipes 31 by pumps 33 and 34; a check valve 32 relieves unwanted pressure in the pipes. The pipes 31 may be installed for equipment and a second set of pipes may be installed for computers. The pipes function as dynamic electrolytic capacitors supplied from an underground tank or reservoir 38.

Tank 38 has makeup water system 43 with a shut off valve 44 as the electrolytic level 48 is monitored by float valve 45. The depth of burial of the tank 38 is a minimum of 2 feet. The tank 38 is filled with electrolyte crystals or powder 39 to maintain a saturated solution of electrolyte.

The tank 38 is fitted with pipes 30 and 31 submerged in the electrolyte 39 with tank strainers 53 and in-pipe strainers 54. The tank 38 has an access cover 56 and a vent 35. Pipes 30 and 31 similarly have gas relief vents 57. The tank 38 also is fitted with an electrolyte sensor system 58 to monitor pH, ORP and other cleaning parameters with deviation from set point alarms. The pipes 30 and 31 are similarly fitted with inline pipe electrolytic sensors 64.

Ground shield wire mesh 40 is placed around the tank to shield against stray ground currents 36 operating with sacrificial anode 1. Charcoal and salt 37 may be packed between the mesh 40 and tank 38 to facilitate electrical conduction. The ground loop current is continuously monitored by the computer 3 with directs electrolyte pumps 33 and 34, operating continuously to prevent backflow, to adjust velocity of the electrolyte fluid in the pipes based on operating conditions to maintain near-zero ground potential. The electrolytes flowing in the pipes therefore function as a flushed out grounding system.

The pipes walls in 30 and 31 are sized as solid conductors for the entire system grounding load, and the pipe barrel size is sized for very low electrolytic velocities. Pipes are fitted with connection lugs 60 for ground and neutral connections.

Pipe fittings (as elbows) are cross-connected for minimum resistance electrically by-passing conducting lugs 47 to compensate for relatively high electrical resistance at the pipe joints.

Thus, energy in electrical noise transients and neutral currents directed to ground is absorbed by the flushing electrolyte. Some of this energy is absorbed by the solid metal ground system. The remaining energy is transferred to the electrolyte and grounded in the underground tank 38. The energy deposited in the charged electrolyte deposited in the tank is retrieved through anode 41 and cathode 42 enabling the reservoir to function as a chemical battery in extracting electrical charge from the electrolyte and charging a bank of electrical batteries or otherwise deriving electrical power from the anode and cathode.

I claim:

1. A modular wiring system comprising a first field interface device for electrical load distribution a first bundle of electrical wires connected between the field interface device and a power source, one or more sets of wires electrically connected between the field interface device and an electrical load, switching means in the field interface device for selectively connecting a set of wires to wires within a bundle of wires.

2. The invention of claim 1 further comprising a second bundle of wires connected between the field interface device and an electrical load, and switching means in the field interface device for selectively interconnecting wires in the first bundle of wires with one or more wires in the second bundle of wires.

3. The invention of claim 2 further comprising a plurality of additional field interface devices, and a plurality of bundles of wires each connected between additional field interface devices, and switching means in each field interface device for selectively interconnecting wires between bundles of wires connected thereto.

4. The invention of claim 3 in which the field interface devices are interconnected to form a network of bundles of wires selectively connected at field interface devices as node points.

5. The invention of claim 1 in which the field interface device is electrically switchable between wires in the bundle of wires.

6. The invention of claim 5 further comprising a computer control module in communication with each field interface device and programmed to direct selective electrical connection of a set of wires to wires within a bundle of wires between wires.

7. The invention of claim 6 in which each field interface device has an address recognizable by the computer control module.

8. The invention of claim 6 further comprising a load transfer module to which the primary bundle of wires are connected for connecting electrical power to field interface devices on a power line carrier.

9. The invention of claim 8 in which the computer control module communicates with each field interface device by multiplexing a data signal on the power line carrier.

10. The invention of claim 1 further comprising an electrically conductive pipe in a loop to which are connected field interface devices as a ground, electrolyte within the pipe minimizing potential differences between field interface devices by absorbing energy necessary to take the differences to near zero therein charging the electrolyte, a electrically grounded, conducting electrolyte reservoir in electrical communication with the conductive pipe into which charged electrolyte is deposited and from which the conductive pipe draws discharged electrolyte, pump means for causing the electrolyte to flow in the conductive pipe loop.

11. The invention of claim 10 further comprising an electrolyte quality monitor.

12. The invention of claim 10 further comprising a chemical battery in the reservoir interacting with the electrolyte to extract electrical energy from the electrolyte before discharging the electrolyte to electrical ground.

13. The invention of claim 3 further comprising variable capacitors providing lead current to compensate for local inductive loads within the wire bundles and field interface devices.

14. An electrical grounding system providing a near-zero electrical ground throughout a building, comprising an electrically conductive pipe in a loop to which are connected field interface devices as a ground, electrolyte within the pipe minimizing potential differences between field interface devices by absorbing energy necessary to take the differences to near zero therein charging the electrolyte, a electrically grounded, conducting electrolyte reservoir in electrical communication with the conductive pipe into which charged electrolyte is deposited and from which the conductive pipe draws discharged electrolyte, pump means for causing the electrolyte to flow in the conductive pipe loop.

15. The invention of claim 14 further comprising a chemical battery in the reservoir interacting with the electrolyte to extract electrical energy from the electrolyte before discharging the electrolyte to electrical ground.

16. The invention of claim 1 further comprising a plurality of additional field interface devices each with a unique electronically identifiable address interconnected to form a network of bundles of wires selectively connected at field interface devices as node points, a plurality of bundles of wires connected between field interface devices, switching means in each field interface device for selectively interconnecting wires between bundles of wires connected thereto, a load transfer module providing electrical power to field interface devices on a power line carrier through one or more bundles of wires connected therebetween, a computer control module in communication with the load transfer module and selective directing its connection through primary bundles of wires to field interface devices and also in communication with each field interface device, recognizing its unique address, and programmed to direct in the switching means selective electrical connection of a set of wires to wires within a bundle of wires between wires.

17. The method of wiring a building or other facility using a plurality of additional field interface devices each with a unique electronically-identifiable address interconnected to form a network of bundles of wires selectively connected at field interface devices as node points, a plurality of bundles of wires connected between field interface devices, switching means in each field interface device for selectively interconnecting wires between bundles of wires connected thereto, a load transfer module providing electrical power to field interface devices on a power line carrier through one or more bundles of wires connected therebetween, a computer control module in communication with the load transfer module and selective directing its connection through primary bundles of wires to field interface devices and also in communication with each field interface device, recognizing its unique address, and programmed to direct in the switching means selective electrical connection of a set of wires to wires within a bundle of wires between wires, comprising the following steps:

a. installing one or more selectively switchable field interface devices in the facility interconnected by a bundle of wires into a network, b. installing the load transfer module providing electrical power to field interface devices on a power line carrier through one or more bundles of wires connected therebetween, c. installing the computer control module in communication with the load transfer module d. through the computer control module, selectively directing connection of the load transfer module to field interface devices through bundles of wires running therebetween.

18. The method of claim 17 further comprising the step of optimizing electrical load distribution within the network by continually reconnecting wires between the bundles through the switching means at the field interface devices at the direction of the computer control module.

19. The method of claim 17 further comprising the step of a. installing a near-zero ground circuit throughout the facility in an electrically conductive pipe in a loop b. minimizing potential differences between field interface devices by pumping electrolyte within the pipe to absorb energy necessary to take potential differences to near zero therein charging the electrolyte, the electrolyte routed in the pipe in a loop to a conducting electrolyte reservoir in electrical communication with the conductive pipe into which charged electrolyte is deposited and from which the conductive pipe draws discharged electrolyte, c. connecting field interface devices to the pipe as a ground.

20. The invention of claim 19 further comprising the step of extracting electrical energy from the electrolyte before discharging the electrolyte to electrical ground by installing an anode and a cathode into the reservoir in the manner of a chemical battery.

* * * * *